United States Patent [19]

Priese

[11] 4,175,578
[45] Nov. 27, 1979

[54] FIRE RESISTANT SEAT FOR BUTTERFLY AND BALL VALVES

[75] Inventor: Werner K. Priese, Barrington, Ill.

[73] Assignee: Hills-McCanna Company, Carpentersville, Ill.

[21] Appl. No.: 840,601

[22] Filed: Oct. 11, 1977

[51] Int. Cl.² ............................................. F16K 1/22
[52] U.S. Cl. .............................. 137/67; 29/157.1 R; 29/446; 251/306; 277/26
[58] Field of Search .............. 137/67; 29/447; 277/26; 264/230; 251/306

[56] References Cited

U.S. PATENT DOCUMENTS 4,036,669  7/1977  Brook et al. ..................... 148/11.5 C

FOREIGN PATENT DOCUMENTS 45-32861  10/1970  Japan ....................................... 251/306

Primary Examiner—Martin P. Schwadron
Assistant Examiner—Richard Gerard
Attorney, Agent, or Firm—Trexler, Wolters, Bushnell & Fosse, Ltd.

[57] ABSTRACT

The invention contemplates a flow control valve that provides emergency sealing action upon inadvertent, thermally induced failure of the primary seal. The body of the valve includes an annular shoulder that is disposed adjacent an annular seat; and an annular collar of substantially incombustible corrosion resistant, nongalling material is specifically mounted on the shoulder, the collar including a first portion hermetically connected to the shoulder and a second, lip like portion free to move with respect to the shoulder and normally spaced from the selectively positionable valve element. This collar and more specifically the lip portion thereof is provided with prestressed regions normally situating the lip portion proximate the body shoulder and in position wherein said lip portion will not interface with the movable valve element. Upon thermal relief of the stresses stored in such regions, the collar reacts to dispose the second, or lip portion into sealing engagement with the valve elements when in the flow aperture closing position. This stress relief is permanent, such that upon subsequent cooling of the valve, the collar lip portion will remain in sealing engagement with the valve element, thereby preventing leakage, even though the primary seal may have been destroyed by the thermal event.

11 Claims, 4 Drawing Figures

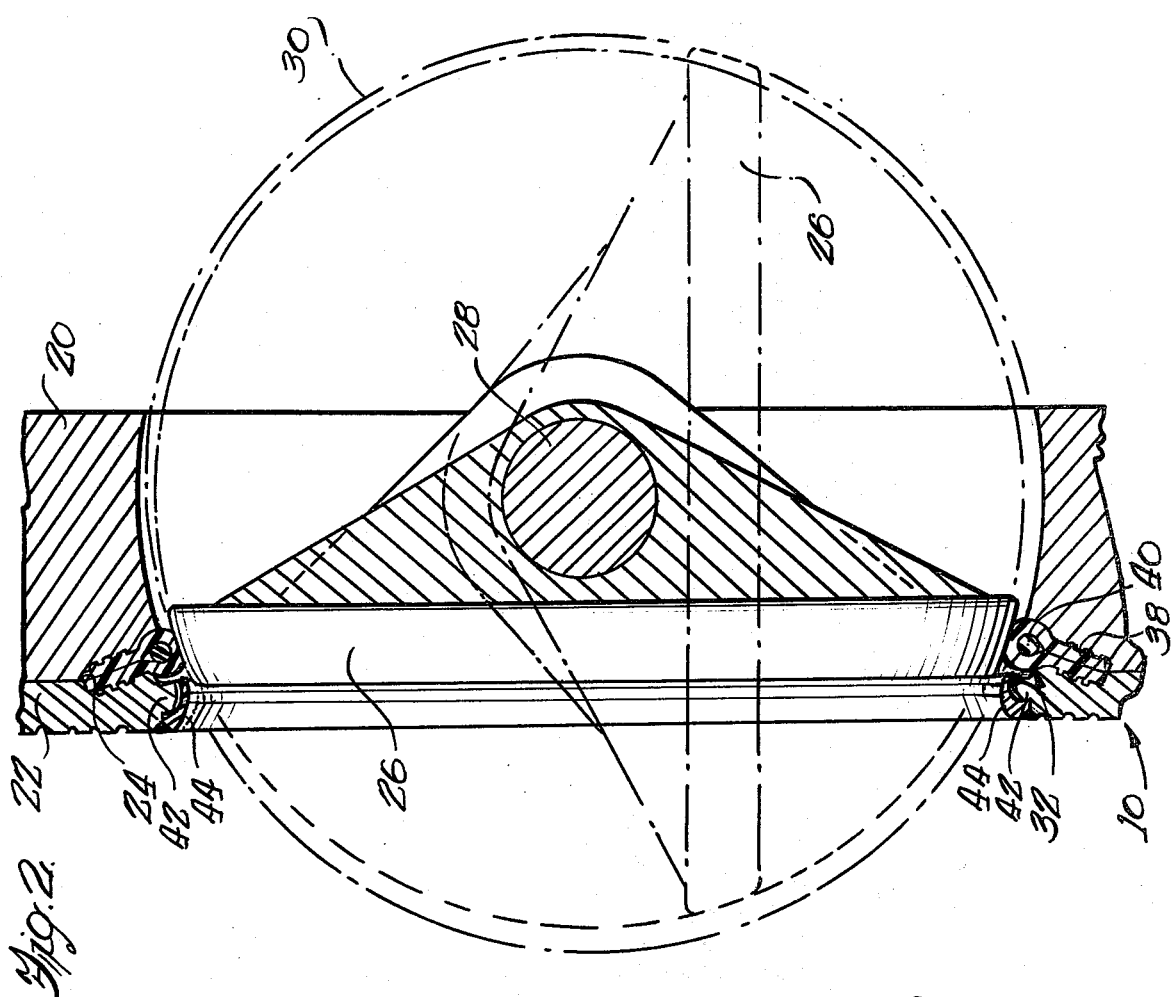
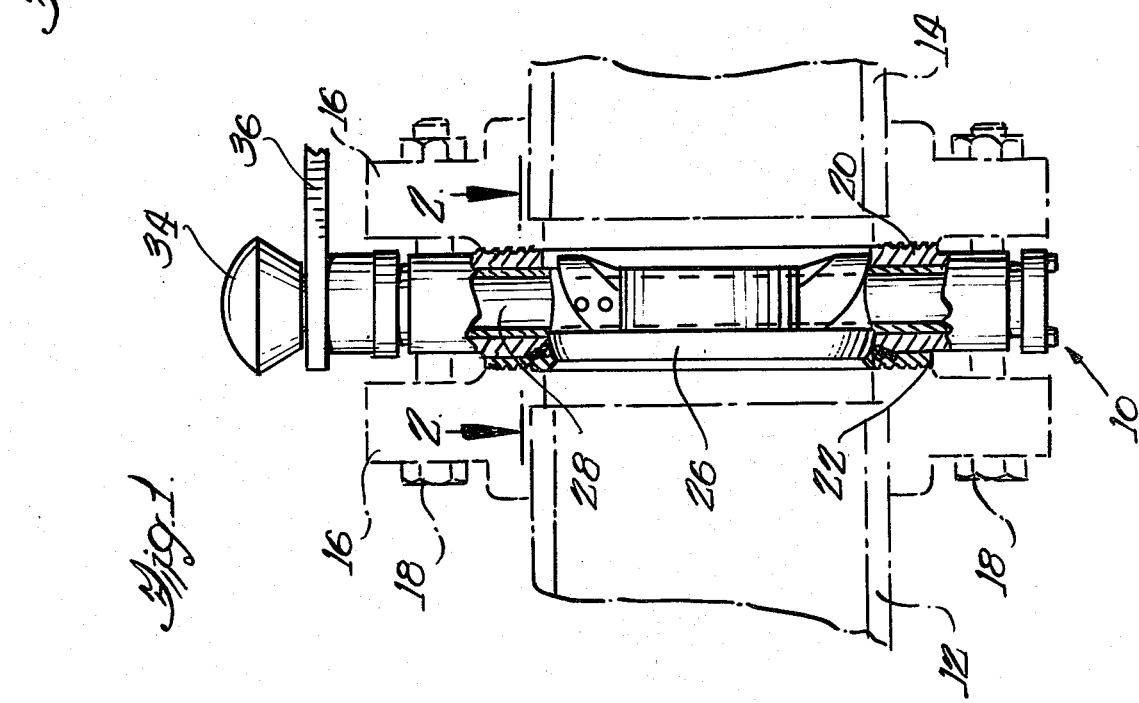

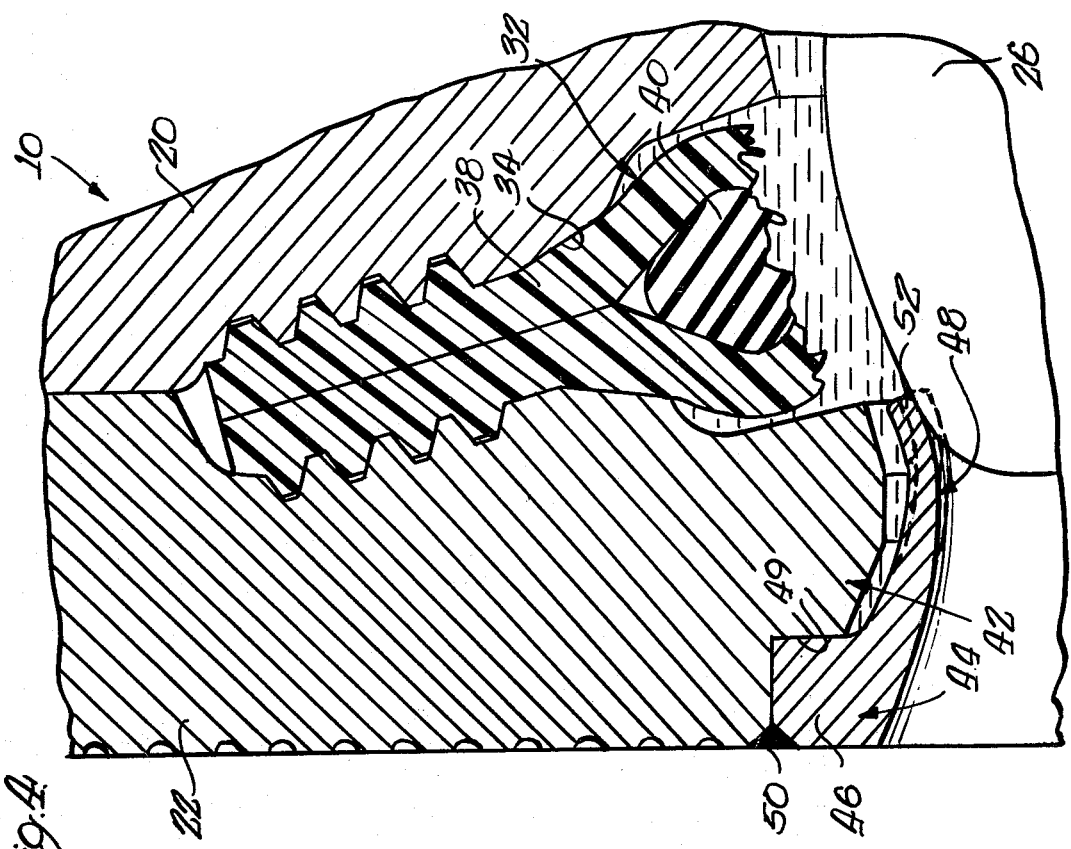
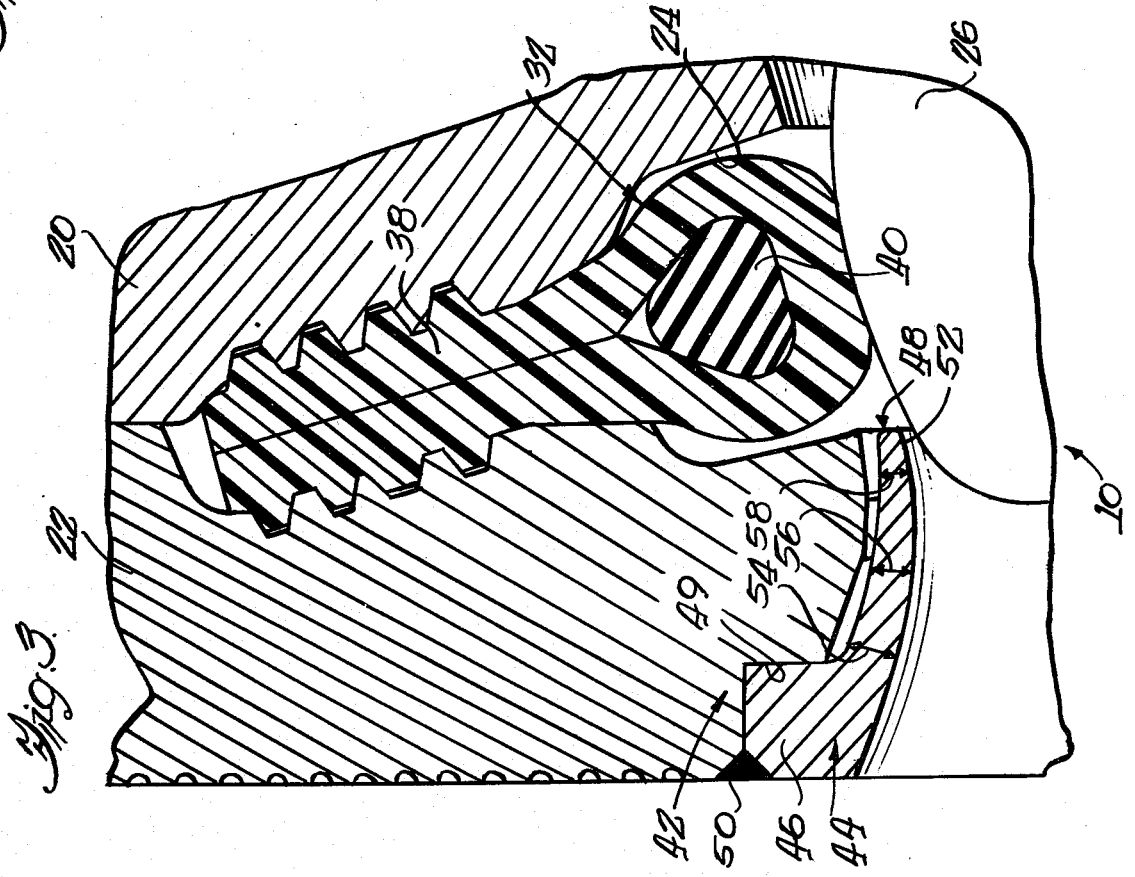

FIRE RESISTANT SEAT FOR BUTTERFLY AND BALL VALVES

BACKGROUND OF THE INVENTION

This invention relates generally to flow control valves and more particularly to such valves that provide for continuity in valve sealing action upon exposure to fire or any like, extraordinary thermal event.

Ball valves and butterfly valves used in regulating the flow through pipes carrying petroleum hydrocarbons and like fluids commonly incorporate elastomeric seals fabricated from such materials as fluorocarbon polymers, polyurethanes, and various olefinic polymers and copolymers. Even the more thermally stable of these materials fail in their valve sealing function at temperatures in excess of about 650° F. In my U.S. Pat. No. 3,537,682, I have disclosed inorganic valve seals which function effectively at temperatures on the order of 1200°-1300° F. However, the latter seals are costly and are less desirable than elastomeric seals for use at more conventional operating temperatures. In addition, it has been known heretofore to construct flow control valves with auxiliary metal seats or seals which are normally disposed in approximate contact with the valve element and which rely primarily upon thermal expansion during a fire or the like in order to effect a safety sealing action. Under normal conditions these seals will not provide an effective seal, as to do so would require a degree of engagement with the movable valve element that would impede the desired ease of valve operation. Accordingly, upon cooling down after the fire has been struck, these prior art metal seals will contract and assume their normal position, resulting in an interuption of the contact with the valve element, creating a danger of leakage.

It is, therefore, an important object of my present invention to provide a flow control valve with an auxiliary seal that affords continued sealing action after once having been exposed to extraordinary high temperatures and regardless of subsequent cooling.

A more general object of the invention is to provide a new and improved flow control valve having fire safety features.

Another object of the invention is to provide a fire safety valve which functions regardless of the direction of flow pressure.

These and other objects and features of the invention will become more apparent upon a consideration of the following descriptions.

BRIEF DESCRIPTION OF THE DRAWINGS

In order that the principals of the invention may be readily understood, a single embodiment thereof, applied to a butterfly valve but to which the application is not to be restricted, is shown in the accompanying drawings wherein:

FIG. 1 is a central sectional view taken in side elevation and showing a butterfly valve constructed in compliance with the present invention, the conduits or pipes which are connected to the valves being illustrated in broken outline;

FIG. 2 is an enlarged sectional view taken substantially along the line 2—2 of FIG. 1;

FIG. 3 is a further enlarged, fragmentary sectional view showing the relationship between the primary seal and the auxiliary fire seal of the present invention, illustrating the parts in their normal configuration of use; and FIG. 4 is a view similar to the showing of FIG. 3 but illustrating the configuration of the parts upon failure of the primary seal and functioning of the auxiliary seal after the occurrence of an extraordinary thermal event.

DESCRIPTION OF THE ILLUSTRATED EMBODIMENT

Referring now in detail to the drawings, specifically to FIGS. 1 and 2, a disc or butterfly valve 10 which is constructed in compliance with the present invention is shown clamped in flow control relationship between the ends of a pair of aligned pipes or conduits 12 and 14. Each of the pipes 12 and 14 is provided with an end flange 16 rigidly attached thereto; and a suitable number of nut-and-bolt units 18 is disposed in a circular pattern for use in drawing the flanges 16 toward each other in order to clamp the valve 10 therebetween.

The auxiliary fire safety seal of the present invention is usefully employed in various types or styles of valve. For purposes of the present disclosure, it is illustrated in conjunction with the construction of a disc or butterfly valve, such as is disclosed in my U.S. Pat. No. 3,563,510. Accordingly, the valve 10 includes a main valve body 20 and a valve body clamping ring 22 which cooperate to define an annular groove or valve seat 24. A flow control valve element or disc 26 is mounted on a support shaft 28 for rotation between a closed position indicated in solid outline in FIG. 2 and an open position shown in broken outline in that illustration, the arc of traverse of the valve disc or element 26 being indicated by the reference numeral 30. The valve element 26 is preferably crowned in transverse section to present a spherical curvature to a polymeric primary seal ring 32. An operating handle 34 is attached to the shaft 28, as shown in FIG. 1, for selectively positioning the valve element 26 with respect to the circular valve opening defined by the primary sealing ring 32; and if desired, provision for locking the handle in a desired position may be incorporated in the valve 10 by means including an anchor plate section 36. Means for biasing the valve element 26 into valve closing condition is also use fully included in the valve 10.

With particular reference to FIG. 2, the primary sealing ring 32 comprises a strip 38 of yieldable, resilient polymeric material, such as polytetrafluoroethylene, folded about an annular, elastomeric reinforcing member 40 having normally torodial shape. Such an arrangement has been termed a caulking ring.

Other details of the construction of valve 10, the normal mode of operation thereof, and cooperation of the respective parts are described more fully in my aforesaid U.S. Pat. No. 3,563,510. However, in compliance with the principles of the present invention, the valve body 20 and specifically the clamping ring 22 is arranged to define an annular shoulder 42 situated generally in the downstream direction from the annular valve seat 24, as is best seen in FIG. 3. In further compliance with the present invention, an annular collar 44 which is to provide the auxiliary or emergency seal is fabricated of a substantially incombustible material, and is to be mounted on the shoulder 42. Collar 44 includes a first downstream edge portion 46 that is hermetically connected to the shoulder 42, as by a continuous annular weld 50 and a second upstream lip portion 48 which is free to move with respect to the shoulder 42. Advantageously, the collar 44 is fabricated from a suitable corrosion resistant metal, preferably stainless steel, or similar alloy which is selected due to its ability to release stored stresses upon being heated above a predetermined temperature.

Continuing with reference to FIG. 3 the configuration of the collar 44 will now be considered in greater detail. It should be noted, however, that the design of collar 44 shown in the drawings, while possessed of novel features in and of itself, has been selected for purposes of illustration and discussion of the broad concept of the overall invention. Indeed, it is contemplated and intended that other collar designs can and will be employed without departure from the invention, depending of course, upon the structure of the valve and the particular use thereof.

With the above in mind, attention is directed to the collar 44 of FIG. 3. More specifically, the first, or downstream edge 46 of said collar 44 is of a greater cross sectional thickness than the lip portion 48. Edge 46 is received in an annular notch 49 in shoulder 42 to facilitate positioning and welding of the collar 44 to the valve body component 22. Extending from the annular edge portion 46 is the annular lip portion 48, having a free end section designated generally 52 and spaced slightly from the shoulder 42. The lip portion 48 is preferably shaped, in cross-section, to correspond to a beam of constant stress. That is, to say, the cross-sectional thickness of the lip portion 48 at location 54 is greater than that at location 56, which in turn is greater than the cross-section thickness at location 58 proximate the free end 52. These dimensions and the taper of the lip 48 can be determined by standard formulas to provide an approximately constant stress along the length of said lip. In addition, the tapered configuration insures that the free end 52 will flex elastically after being brought into contact with the valve element 26 subsequent to the thermal event. This feature, thus permits the valve element to be operated after said thermal event, without the danger of permanent deformation of the lip portion 48 and destruction of its ability to seal effectively against the valve element 26.

Turning now to the method of fabricating the overall valve, the collar 44 is initially formed to the general configuration as shown in FIG. 4, with the exception of the free end 52 which extends approximately as shown in dotted outline. Thus, with the illustrated design, the collar 44 can be easily disposed within the bore of clamp ring 22 and then assembled to the shoulder 42, such as by the weld 50. Next, the collar 44 and most particularly the lip portion 48 is stretched circumferentially, by rolling or some other suitable well-known method of cold working to attain a stressed circumferential dimension of the general configuration as shown in FIG. 3, viz., with the lip portion 48 disposed such that it will not adversely affect or interfere with the operation of the valve element 26. For collar 44, the exact cold working process and sequence of operation, i.e., whether cold worked prior to or after connection to the valve body element, depends to a great extent upon the particular valve structures and operational features. Thus, it is to be understood that the disclosed method of fabrication wherein cold working by rolling is effected after the collar 44 is assembled, is illustrative of one form of the overall concept of the invention. Accordingly, where the valve design permits, the auxiliary or emergency seat or seal may be cold worked by alternate known process, other than rolling, and/or assembled to the valve body component after cold working, without departing from the invention.

With continued reference to FIG. 3, and the illustrated embodiment, the circumferential stretching of the lip portion 48 alters the dimension of said lip so that it will be disposed in closer proximity to shoulder 42, with the free end 52 undergoing the greater increase in circumferential dimension. This relationship is illustrated by a comparison of FIGS. 3 and 4. While it would be desirable to have the lip portion 48 in engagement with shoulder 42, to reduce wear thereof due to any abrasion in the fluid passing through the valve and to assure that it does not contact the valve element 26 during normal operation, this is not practical with the illustrated embodiment and method of assembly. More specifically, due to the resilient nature of material from which collar 44 is fabricated, and the limitations upon its deformation during cold rolling existing due to its prior attachment to the lip 48 cannot be stretched sufficiently to attain flush contact with said shoulder and will tend to return to a position wherein it is slightly spaced from said shoulder 42.

As an additional matter, and as noted above, it is preferable that the lip portion 48 not contact the valve element 26 during normal operation, since a high degree of contact would tend to increase the force required to operate the valve, or could result in galling between lip portion 48 and the valve element. It can be appreciated, however, that a slight degree of engagement of the free end 52 with the valve element 26 can be tolerated, provided it does not increase operating force requirements above acceptable levels and does not induce galling.

Discussion will now be directed to the ability of the valve as discussed above, to provide an effective seal both during and after a thermal event. Accordingly, should the valve and its component collar 44 be exposed to excessive high temperatures, as upon exposure to a fire or other extraordinary thermal event, sufficient to destroy the ability of the primary seal 32 to block fluid flow, the stresses stored in the collar lip portion 48, will be relieved thermally and said lip portion 48 will tend to return to its original shape. As this occurs, the lip 48 will move into sealing engagement or contact with the valve element 26; or at least assuming a position such that when said valve element 26 is closed, said engagement will result, as is shown in FIG. 4. Of specific importance here is the fact that this relief of the collar 44 and repositioning of lip portion 48 is permanent, and subsequent cooling will not disrupt the engagement of the lip portion 48 with the valve element 26.

Partial destruction of the primary sealing ring 32 has been suggested in FIG. 4, as well as invasion by line fluid of the space between the shoulder 42 and the collar 44. As will be appreciated, upstream pressure elastically deflects the valve element into contact with the collar and thus promotes the creation of a seal between valve element 26 and the end 48 of collar 44. However, elastic memory of the collar alone, upon release of the stored stresses, can be arranged to provide an effective seal, even under conditions of backpressure from the downstream side of the valve element.

The drawings and the foregoing descriptions are not intended to represent the only form of my invention in regard to the details of its construction and manner of operation. Changes in form and in the proportion of parts, as well as the substitution of equivalent, are contemplated as circumstances may suggest or render expedient; and although specific terms have employed, they are intended in a generic and descriptive sense only and not for the purposes of limitation, the scope of the invention being delineated in the following claims.

The invention is claimed as follows:

1. In a flow control valve for providing emergency sealing action upon inadvertant, thermally induced failure of the primary seal, the combination comprising: valve body means defining a fluid flow aperture; a selectively positionable valve element disposed in said fluid flow aperture; primary sealing means cooperating with said valve element for sealing said fluid flow aperture when said valve element is in a valve closed position; and a secondary, emergency seal adapted to cooperate with said valve element for sealing said aperture upon subjection of said valve to a thermal event, said secondary seal comprising an annular member of substantially incombustible material capable of releasing stored stresses upon being heated above a predetermined temperature mounted on said valve body means and including a first portion hermetically connected to valve body means and a second, lip portion free to move with respect to said valve body means, at least said lip portion of said annular member having prestressed regions normally situating said lip portion out of firm contacting relationship with respect to said valve element, and upon thermal relief of the stresses stored in said prestressed regions, said lip portion reacting to dispose at least a portion thereof into sealing engagement with said valve element when in the valve closed position.

2. A valve according to claim 1 wherein said valve body means includes annular shoulder means disposed downstream from said primary sealing means, and said annular member of said secondary seal is attached to said shoulder means with said first portion downstream of said second, lip portion, such that fluid pressure will assist in attaining and maintaining said secondary seal in engagement with said valve element upon thermal relief of said prestressed lip portion.

3. A valve according to claim 1 wherein said incombustible material is stainless steel.

4. A valve according to claim 1 wherein said first portion of said annular member is relatively enlarged with respect to said second lip portion in cross sectional area, and said prestressing is limited to said second lip portion.

5. A valve according to claim 4 wherein said second lip portion is provided with a cross-sectional thickness decreasing in a direction away from said first portion and toward the free end of said second lip portion.

6. A valve according to claim 1 wherein said second, lip portion is of a cross-sectional thickness decreasing in a direction away from the first portion toward the free end of said second, lip portion.

7. A method of fabricating a valve having a primary sealing member, and an emergency secondary seal to provide a sealing action against a selectively operable valve member upon thermally induced failure of the primary sealing member, said method including the steps of: providing a valve body component defining a portion of the fluid flow bore of said valve; providing an annular member of a substantially incombustable material capable of releasing stored stresses upon being heated above a predetermined temperature which will define said emergency secondary seal, and which includes at least a portion thereof, of an initial internal dimension to engage sealingly said valve element; cold working at least said portion of said annular member prior to final assembly to expand circumferentially said initial internal dimension of said portion said step of cold working to produce circumferential expansion including the establishing of prestressed regions in said portion which stresses are capable of thermal relief, such that upon exposure of said valve to a thermal event after final assembly, the stresses in said portion will be relieved and said portion will tend to return to its initial dimension and thereby to effect sealing engagement with said valve member.

8. A method according to claim 7, further including the step of connecting an edge of said annular member to said valve body component prior to said step of circumferential expansion, with said portion extending inwardly of said fluid flow bore.

9. A method according to claim 7 wherein said step of cold working includes the step of rolling.

10. In a flow control valve for providing emergency sealing action upon inadvertant, thermally induced failure of the primary seal, the combination comprising: valve body means defining a fluid flow aperture; a selectively positionable valve element disposed in said fluid flow aperture; primary sealing means cooperating with said valve element for sealing said fluid flow aperture when said valve element is in a valve closed position; and a secondary, emergency seal adapted to cooperate with said valve element for sealing said aperture upon subjection of said valve to a thermal event, the improvement wherein said secondary seal comprising a circumferentially continuous annular member of substantially incombustible material capable of releasing stored stresses upon being heated above a predetermined temperature carried by said valve body means and surrounding said valve element, said circumferentially continuous annular member having at least an internal portion thereof cold worked to an internal diameter of sufficient dimension to maintain said annular member out of contact with said valve element during normal operation, and said internal portion including circumferentially continuous regions which are in a prestressed condition and capable of thermal relief upon subjection of said circumferentially continuous annular member to a thermal event, such that upon thermal relief of said prestressed regions said internal portion will contract to attain sealing engagement with said valve element.

11. A valve according to claim 10 wherein said internal portion is a lip portion.

* * * * *

UNITED STATES PATENT AND TRADEMARK OFFICE
CERTIFICATE OF CORRECTION

PATENT NO. : 4,175,578
DATED : November 27, 1979
INVENTOR(S) : Werner K. Priese

It is certified that error appears in the above-identified patent and that said Letters Patent are hereby corrected as shown below:

References Cited:

| | | | |
|---|---|---|---|
| 4,105,040 | 8/1978 | Chester | 137/72 |
| 3,336,913 | 8/1967 | McCormick | 29/447X |
| 3,563,510 | 2/1971 | Priese | 251/173 |
| 3,986,699 | 10/1976 | Wucik et al. | 251/173 |

Jackson, C.M. et al "55 NITINOL - The Alloy with a Memory: Its Physical Metallurgy Properties & Applications." Technology Utilization Office, NASA, Washington, D.C., Chap. 7, pp. 77-79.   29/447

Signed and Sealed this

Fifteenth Day of April 1980

[SEAL]

Attest:

SIDNEY A. DIAMOND

Attesting Officer

Commissioner of Patents and Trademarks